(12) United States Patent
Ghormley

(10) Patent No.: US 7,841,571 B1
(45) Date of Patent: Nov. 30, 2010

(54) TENSION BASED FASTENING SYSTEM FOR HOLDING AN ARTICLE

(75) Inventor: Arnold Bennett Ghormley, Pasadena, TX (US)

(73) Assignee: GAF Innovative Products, Inc., Pasadena, TX (US)

( * ) Notice: Subject to any disclaimer, the term of this patent is extended or adjusted under 35 U.S.C. 154(b) by 0 days.

(21) Appl. No.: 11/934,418

(22) Filed: Nov. 2, 2007

Related U.S. Application Data

(60) Provisional application No. 60/967,305, filed on Sep. 4, 2007.

(51) Int. Cl.
*A47H 1/10* (2006.01)
(52) U.S. Cl. .................. 248/317; 248/339; 248/324; 248/690; 24/373; 24/376; 24/598.5; 59/84
(58) Field of Classification Search .................. 248/339, 248/317, 323, 324, 304, 306, 307, 288.11, 248/288.51, 294.1, 682, 690; 294/82.1, 82.11; 24/115 R, 373, 376, 598.5; 59/84, 85, 87, 59/88
See application file for complete search history.

(56) References Cited

U.S. PATENT DOCUMENTS

| | | | | | |
|---|---|---|---|---|---|
| 321,554 | A | * | 7/1885 | Waterhouse | 59/88 |
| 775,038 | A | * | 11/1904 | Holms, Jr. | 59/88 |
| 3,590,443 | A | * | 7/1971 | Kubsch | 24/13 |
| 5,161,843 | A | * | 11/1992 | Baldwin | 294/26 |
| 5,913,479 | A | * | 6/1999 | Westwood, III | 24/298 |
| 6,256,974 | B1 | * | 7/2001 | Shanks, Sr. | 59/85 |

* cited by examiner

*Primary Examiner*—Terrell Mckinnon
*Assistant Examiner*—Todd M. Epps
(74) *Attorney, Agent, or Firm*—Buskop Law Group, PC; Wendy Buskop

(57) ABSTRACT

A tension-based fastening system for holding an article comprising a forward-facing S-shaped plate and a reverse-facing S-shaped plate. The reverse-facing plate is disposed over and integrally connected to the forward-facing plate, forming a top tensioned holder portion and a bottom tensioned holder portion for removably holding objects. The reverse top arc of the reverse-facing plate and the forward top arc of the forward-facing plate overlap to form a top opening, while the reverse bottom arc of the forward-facing plate and the forward bottom arc of the reverse-facing plate overlap to form a bottom opening. The overlapping arcs provide tension for maintaining each tensioned holder portion in a closed position.

14 Claims, 5 Drawing Sheets

TENSION BASED FASTENING SYSTEM FOR HOLDING AN ARTICLE

CROSS REFERENCE TO RELATED APPLICATIONS

The present application claims priority to co-pending U.S. Provisional Patent Application Ser. No. 60/967,305 filed on Sep. 4, 2007.

FIELD

The present embodiments relate to a lightweight, easy to manufacture, tension-based fastening system for holding an article.

BACKGROUND

A need exists for a fastening system that is lightweight, simple to manufacture, inexpensive to construct and transport, and rapid and easy to utilize.

A further need exists for a fastening system that can simultaneously secure two or more objects in at least two defined openings, without pinching the objects, compressing the objects, or otherwise denting the objects.

The present embodiments meet these needs.

BRIEF DESCRIPTION OF THE DRAWINGS

The detailed description will be better understood in conjunction with the accompanying drawings as follows.

Figure 1:
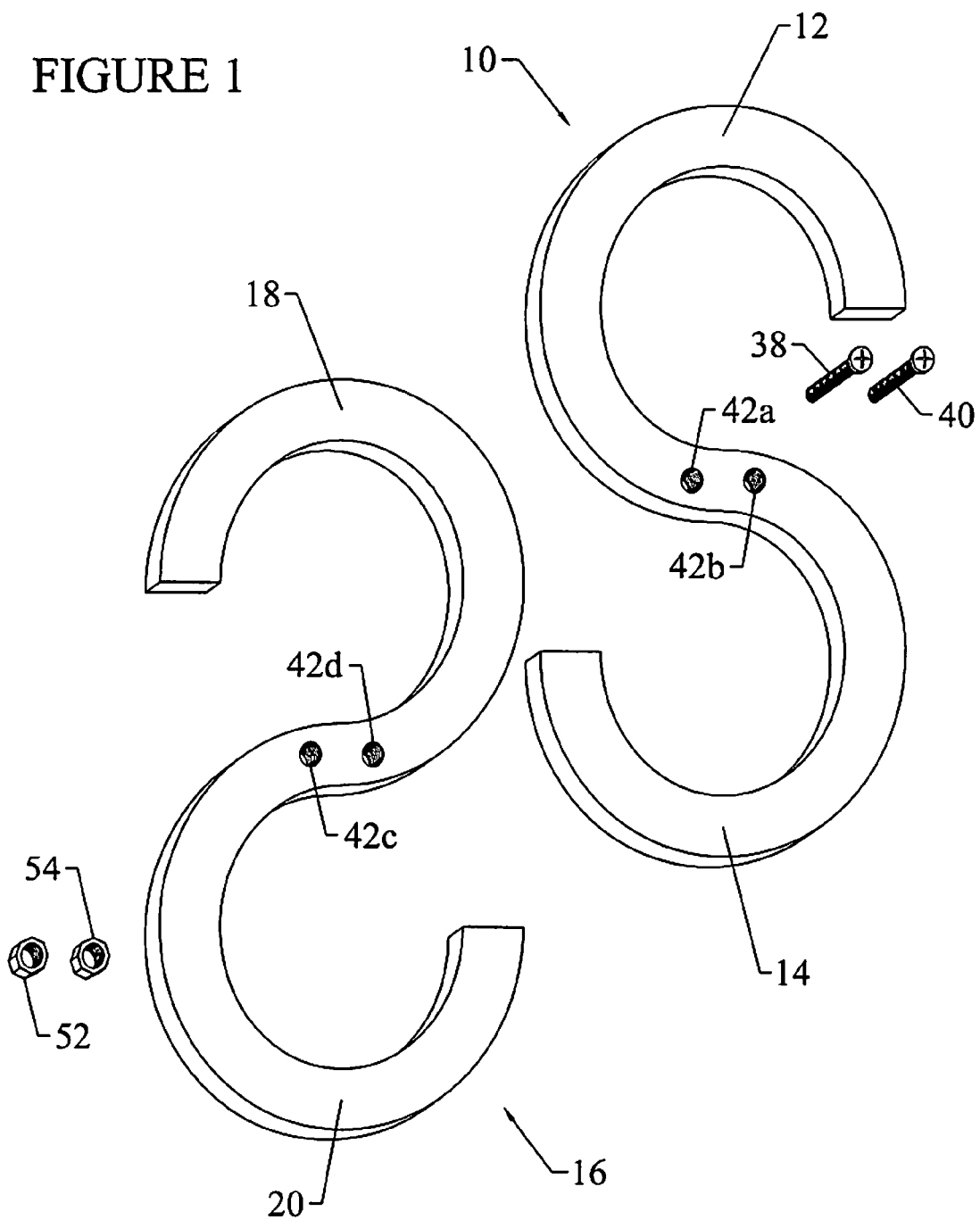
FIG. 1 depicts a perspective view of two S-shaped plates used to form a tension-based fastener.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a tension-based system for holding an article.

The present embodiments are usable for both residential purposes, such as hanging articles of clothing in a closet or securing electrical wires in a basement or attic, and also useful for shop applications and industrial purposes, such as securing industrial air conditioning hoses, industrial welding leads, electrical extension cords, pneumatic hoses, water hoses, and other similar industrial conducting and non-conducting hoses. The present embodiments can also be used to secure advertising signs, educational or inspirational signs, or safety signs.

The present embodiments can be constructed quickly, using a continuous plastic molding process or continuous extrusion process. It is contemplated that the present embodiments can be press molded, although a continuous formation process is preferred due to its improved efficiency. It is contemplated that an embodiment of the tension-based fastener can be constructed in less than one minute.

The present embodiments are lightweight, generally weighing from one ounce to more than five pounds, depending on the intended application for the fastener. The present embodiments are easy to use. A physically disabled person, an elderly individual, or a child can manipulate the tension-based fastener easily and successfully. The present tension-based fastener can secure objects weighing as little as a few ounces to as much as thirty pounds, such as when securing a four-inch water hose, without releasing the object. Securing objects of greater weight can be accomplished by selecting a variety of composite materials for construction of the device.

The present embodiments can advantageously have a pigmented coating or another coating disposed over all or a portion of the fastener. It is also contemplated that colored coatings can be applied to allow easy differentiation of individual fasteners when used in a system. For example, one series of fasteners could be colored yellow for securing electrical cabling, while a second series of fasteners could be colored blue for securing a water hose. It is also contemplated that fasteners could be color-coded to indicate company ownership, such as all fasteners securing a fiber-optic cable belonging to a first company being colored green, while all fasteners securing a hose belonging to a second company are colored orange.

The surface of the fastener can present words or be etched, embossed, or labeled with important information, including a warning or safety information, to prevent individuals from harming themselves by handling electrical cables around water or other conductors. The surface of the fastener can also be etched with a company slogan, name, logo, or other similar identifying information. It is also contemplated that the fastener can be etched with information relating to the contents of a secured hose, the voltage of a secured wire, or other similar information.

The present embodiments further provide the benefit of a variable design. The present tension-based fasteners can be constructed as a one-piece unit or as a two-piece unit.

In an embodiment, the top and bottom tensioned holder portions can have identical openings for securing objects. In another embodiment, the openings can have different sizes. The openings can vary in shape, and be round, elliptical, square, triangular, another polygon shape, or combinations of these.

The present embodiments further provide enhanced safety, having smooth, non-jagged edges that do not injure a user when manipulating the fastener.

It is contemplated that the material from which the present fastener is formed can be selected to avoid corrosion, degradation from ultraviolet radiation or other factors of a harsh environment, such as salt spray or chemical exposure. An embodiment contemplates that the fastener is made from plastic, a urethane-coated material, or a polyamide-coated material, or via composite of Fiberglass™, epoxy-based resins, or other similar composites.

The present tension-based fastening system for holding an article contemplates using a forward-facing, S-shaped plate, which can be a nonmetallic plate. The forward-facing, S-shaped, plate has a forward top arc and a reverse bottom arc.

The fastening system further contemplates using a reverse-facing, S-shaped, plate having a reverse top arc and a forward bottom arc. The reverse-facing, S-shaped, plate can be a nonmetallic plate.

The S-shaped, nonmetallic plates can be made from plastic, such as polyethylene, polypropylene, polyketone, homopolymers, copolymers, cross-linked crystalline homopolymers, and copolymers thereof. The plates can also be made from plastic plates reinforced with fiberglass for improved strength, reduced brittleness, increased durometer, and reduction of breakage due to angular impacts and tensioning.

The S-shaped plates can be made from solid plastic, such as polyethylene, polypropylene, homopolymers, or copolymers thereof. The S-shaped plates can be laminates of these materials. The S-shaped plates can have a coating or be encapsulated by a material having a similar durometer to plastic. Encapsulated materials can include metal, wood, bamboo, woven paper, and other decorative materials or materials to enhance structural properties of the plates.

In a contemplated embodiment, each S-shaped, nonmetallic plate can have a height ranging from 40 to 48 inches and a width ranging from about 20 inches to about 24 inches. Another embodiment contemplates that each S-shaped, nonmetallic plate can have a height ranging from about 2 inches to about 20 inches to and a width ranging from about 1 inch to about 10 inches, wherein the ratio from width to height is approximately 1:2.

Each S-shape is contemplated to be a generally flat, planar structure having a thickness ranging from about 0.125 inches to about 2 inches.

In an embodiment, the plates can have an undulating design or a textured, abraided, non-slip surface to provide an improved grip during installation and increase the ease of use.

It is contemplated that in an embodiment, one or both of the S-shaped plates can be hollow plates. A light kit, such as a fiber optic light kit, can be disposed within one or more of the hollow plates for providing illumination of objects secured by the fastener and providing illumination of a room for improved comfort and safety.

It is also contemplated that a hollow plate embodiment can include decorative materials, such as wood colored to match a closet interior, or materials to enhance structure, such as a polymerized rubber or foam, disposed in the hollow section of the hollow plates.

The S-shaped plates can also be coated with paint or a rubberized material for decorative purposes and to resist abrasion on a secured object. The paint can include an illuminating, light-absorbing paint for illuminating the fastener and the surrounding area.

The coating can also be selected to resist effects from static charges. Coatings can also include flame-retardant materials, materials that resist corrosion and wear, and combinations thereof.

It is contemplated that coatings disposed on the S-shaped plates can have a thickness ranging from one micron to ten microns. The coatings can be smooth. It is also contemplated that the coatings can be textured for aesthetic reasons, for facilitating handing and use of the fasteners by providing an improved grip, and for creating a slight friction between a secured object and the fasteners to prevent the secured object from sliding or changing position within the fasteners.

The reverse-facing, S-shaped plate is disposed over and integrally connected to the forward-facing, S-shaped plate. The S-shaped plates can be integrally connected using one or more fasteners, such as bolts, rivets, or adhesives. Adhesives can include curable epoxies, plastic weld, Superglue™, Strong as Nails™, Gorilla Glue™, and similar glues and adhesives.

It is contemplated that fasteners can be painted or coated before or after application, as described previously.

In an embodiment, both S-shaped plates can be integrally molded or extruded as a one-piece structure. This embodiment is contemplated to result in a stronger fastener that does not require holes or perforations for receiving fasteners and does not include areas secured by adhesives that may separate when exposed to high temperatures or humidity. This embodiment is also contemplated to allow for very rapid, efficient production of fasteners.

In an embodiment, the fastener can be molded such that the thickness of the central portion of each S-shaped plate creates an angle of contact between the overlapping top arcs and bottom arcs, causing the top and bottom arcs to have continuous contact and tension.

The overlaying of the two S-shaped plates forms a top tensioned holder portion for holding a first object and a bottom tensioned holder portion for holding a bottom object. The reverse top arc of the reverse-facing plate overlaps the forward top arc of the forward-facing plate, forming a top opening. Tension between the two top arcs maintains the top tensioned holder portion in a closed position.

Likewise, the reverse bottom arc of the forward-facing plate overlaps the forward bottom arc of the reverse-facing plate, forming a bottom opening. Tension between the two bottom arcs maintains the bottom tensioned holder portion in a closed position.

The tension used to maintain the top and bottom tensioned holder portions in a closed position is contemplated to be sufficient to maintain contact between the two S-shaped plates and hold an object without moving, but light enough to avoid injury and to allow a single person to easily insert or remove objects into or from the openings.

In an embodiment, each opening can have a diameter ranging from about 1 inch to about 20 inches, or more. The top and bottom openings can have differing diameters, or the same diameter. For example, a large top opening can be used to secure a fastener around a fixed object, such as a pipe. A small bottom opening can then be used to secure a single cable or wire, or a small bundle of cables or wires, snugly, leaving little or no additional room for the secured cabling or wiring to slide or change position. This snug securing can prevent long cables and similar objects from laterally sliding, creating cantilevered sections of cable or wire that can appear unsightly and present a safety hazard.

The top and bottom openings can be round openings, or the openings can be elliptical, oval, square, triangular, or other polygon shapes. The top and bottom openings can have the same shapes, or each opening can have a different shape. For example, a round top opening can be used to secure to a round pipe, while a downward-facing triangular bottom opening can be used to secure a wire or cable in the bottom point of the triangular opening, preventing the wire or cable from changing position.

In an embodiment, one or both of the S-shaped plates can be extruded S-shapes having one or both arcs extending about 270 degrees, thereby providing two overlapping arcs with contact surfaces extending for 180 degrees. It is contemplated that the arcs can extend from slightly greater than 180 degrees to slightly less than 360 degrees, depending on the desired length of the contact surfaces between the arcs and the desired amount of tension to maintain the openings in a closed position.

It is contemplated that objects secured by either of the openings can include one or more cords, fiber-optic cables, wires, hoses, pipes, signs, articles of clothing, and combinations thereof, independent of composition or material of the secured object. For example, the present tension-based fastener can have a top opening secured around a pipe or cord near the ceiling of a room, while a sign, such as a safety notice, is secured in the bottom opening. The bottom opening could also be used to secure bundles of wiring close to the pipe, preventing the wiring from dangling and creating a safety hazard.

In an embodiment, one or both of the tensioned holder portions can include one or more perforations through each overlapping arc of both S-shaped plates. The perforations can receive locking mechanisms for preventing unintended or accidental removal of objects from the openings, or theft of the objects.

Locking mechanisms can also be used in an industrial lock-out/tag-out operation, to prevent employees from inadvertently loosening or accessing equipment that is required to be locked.

The present embodiments also relate to a fastening system comprising a plurality of tension-based fasteners connected in series. Each top tensioned portion of each fastener is connected to a first object, such as a pipe, cord, wire, or cable. Each bottom tensioned portion is contemplated to support at least one second object, such as flexible electrical wiring, shop supplies, or signs.

It is contemplated that the top tensioned portion can be secured to a fixed object, such as a pipe, while the bottom tensioned portion is secured to one or more moveable or flexible objects, such as wires, tools, clothing, or notices.

In an embodiment, from about 2 tension-based fasteners to about 500 tension-based fasteners, or more, can be used to secure one or more objects.

The present embodiments also relate to a figure-eight shaped holding system for flexible hoses and electrical cords.

The figure-eight shaped holding system can include a forward-facing and a reverse-facing, S-shaped, nonmetallic plate, as described previously. The reverse-facing, S-shaped, nonmetallic plate is disposed over and integrally connected to the forward-facing, S-shaped, nonmetallic plate, forming a top openable holder portion for securely and removably holding cord or flexible hose, and a bottom openable holder portion for securely and removably holding other objects.

A single fastener is used to connect each S-shaped, nonmetallic plate, allowing rotational movement of each S-shaped, nonmetallic plate.

The figure-eight shaped holding system uses openable holder portions that do not require tension to maintain either holder portion in a closed position. The arcs of each S-shaped, nonmetallic plate are adapted to be manipulated in rotational directions, pivoted about the single fastener, to allow objects to be placed in the top and bottom openings. The rotational motion of each arc can also allow the diameter of the openings to be varied.

Referring now to FIG. 1, two S-shaped plates used to form the present tension-based fastener are shown.

A forward-facing, S-shaped plate (10) having a forward top arc (12) and a reverse bottom arc (14) is depicted. Forward-facing, S-shaped plate (10) has a first perforation (42a) and a second perforation (42b) for receiving fasteners (38 and 40) for securing forward-facing, S-shaped plate (10) to a reverse-facing, S-shaped plate (16).

Reverse-facing, S-shaped plate (16) is shown having a reverse top arc (18) and a forward bottom arc (20). Reverse-facing, S-shaped plate (16) also has a third perforation (42c) and a fourth perforation (42d) for receiving fasteners for securing reverse-facing, S-shaped plate (16) to forward-facing, S-shaped plate (10).

A first fastener (38) and a second fastener (40), depicted as screws, are shown for securing forward-facing, S-shaped plate (10) to reverse-facing, S-shaped plate (16).

First fastener (38) is contemplated to be inserted through first perforation (42a) in forward-facing, S-shaped plate (10) and through third perforation (42c) in reverse-facing, S-shaped plate (16). A first nut (52) is contemplated to be fitted on to first fastener (38) after inserting first fastener (38) through first perforation (42a) and third perforation (42c).

Second fastener (40) is contemplated to be inserted through second perforation (42b) in forward-facing, S-shaped plate (10) and through fourth perforation (42d) in reverse-facing, S-shaped plate (16). A second nut (54) is contemplated to be fitted on to second fastener (40) after inserting second fastener (40) through second perforation (42b) and fourth perforation (42d).

While FIG. 1 depicts first fastener (38) and second fastener (40) as threaded screws for receiving first nut (52) and second nut (54), it is contemplated that forward-facing, S-shaped plate (10) and reverse-facing, S-shaped plate (16) can also be secured together using non-threaded fasteners, such as rivets, or through use of adhesives or epoxies. Use of adhesives would negate the need for perforations (42a, 42b, 42c, and 42d).

Figure 2:
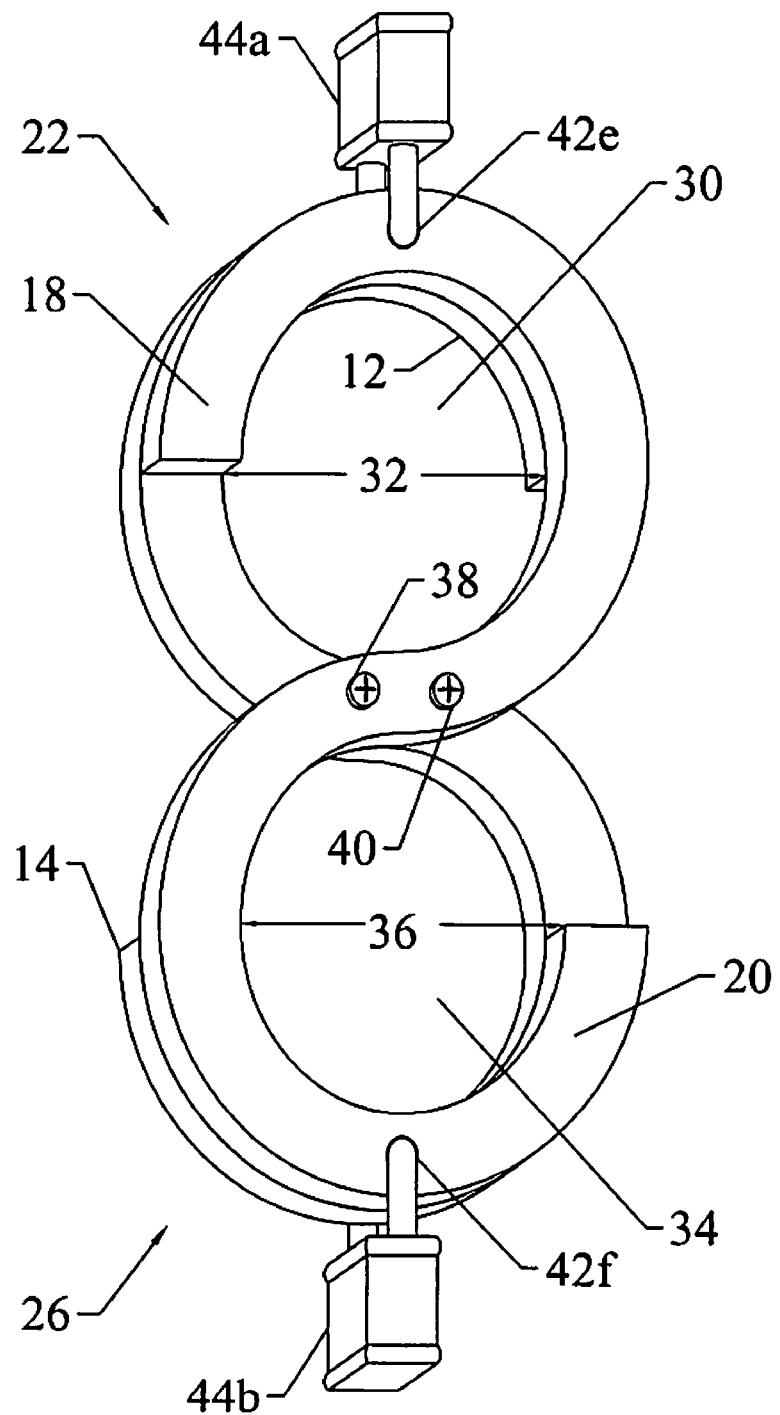
FIG. 2 depicts a perspective view of an embodiment of a tension-based fastener.

Referring now to FIG. 2, an embodiment of the present tension-based fastener is shown.

The depicted tension-based fastener is formed from two overlapping S-shaped plates secured together using first fastener (38) and second fastener (40).

Reverse top arc (18) is shown disposed over and overlapping forward top arc (12), forming a top tensioned holder portion (22). Top tensioned holder portion (22) has a top opening (30) with a first diameter (32). It is contemplated that top tensioned holder portion (22) can be secured around any object having no dimension larger than first diameter (32), such that the secured object is encircled by top opening (30).

Forward bottom arc (20) is shown disposed over and overlapping reverse bottom arc (14), forming a bottom tensioned holder portion (26). Bottom tensioned holder portion (26) has a bottom opening (34) with a second diameter (36). Second diameter (36) can be greater, less than, or equal to first diameter (32). It is contemplated that bottom tensioned holder portion (26) can be secured around any object having no dimension larger than second diameter (36), such that the secured object is encircled by bottom opening (34).

A fifth perforation (42e) can be disposed through reverse top arc (18) and forward top arc (12) for receiving a first locking device (44a), which secures reverse top arc (18) to forward top arc (12). A sixth perforation (42f) can be disposed through forward bottom arc (20) and reverse bottom arc (14) for receiving a second locking device (44b), which secures forward bottom arc (20) to reverse bottom arc (14).

First and second locking devices (44a and 44b) are contemplated to protect objects secured within bottom tensioned holder portion (26) or top tensioned holder portion (22) from accidental removal or theft.

Figure 3:
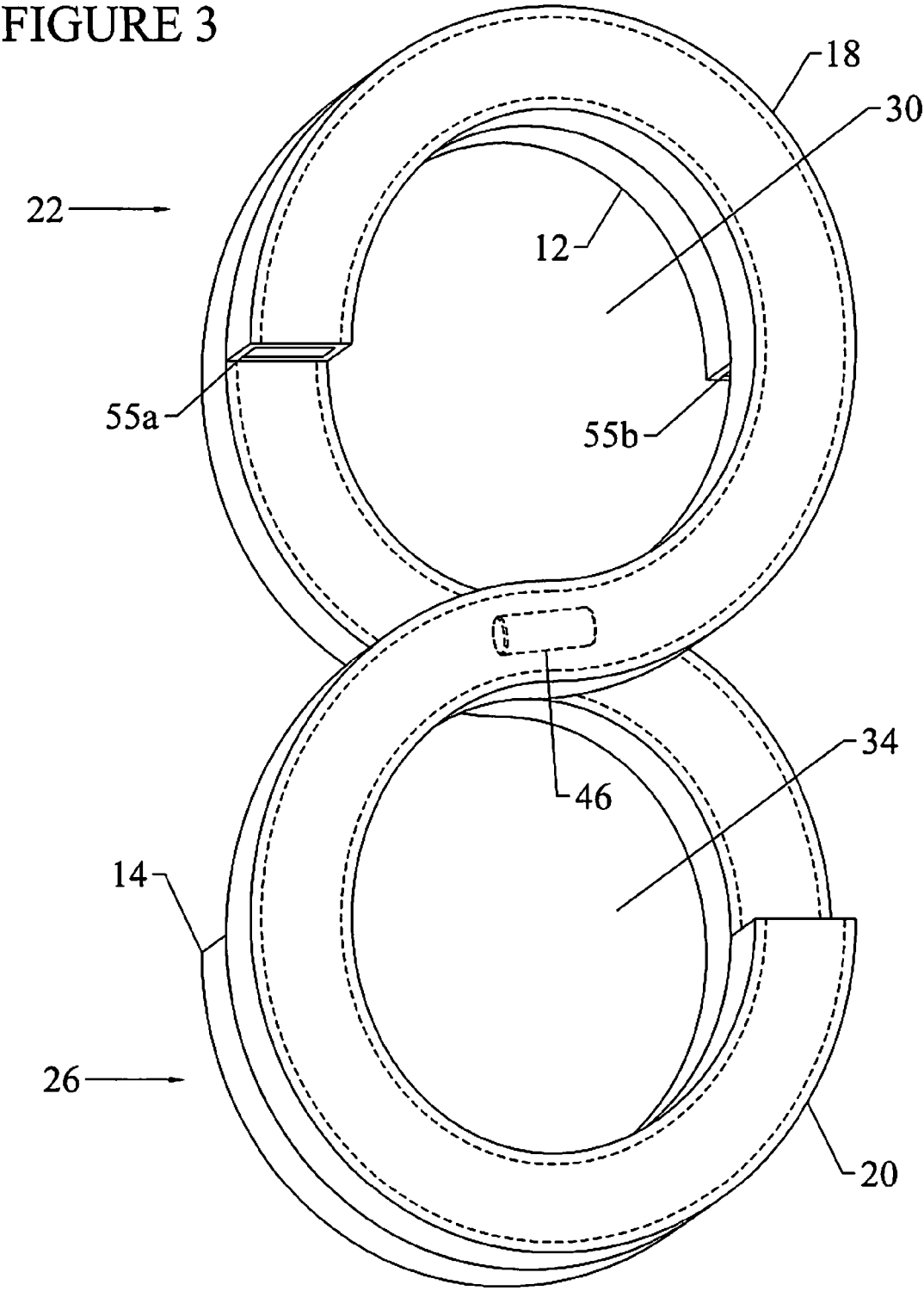
FIG. 3 depicts an alternate embodiment of a tension-based fastener.

Referring now to FIG. 3, an alternate embodiment of a tension-based fastener is depicted.

The depicted tension-based fastener is formed from as single-piece construction having two overlapping S-shaped, nonmetallic plates.

Reverse top arc (18) is shown disposed over and overlapping forward top arc (12), forming top tensioned holder portion (22) having top opening (30). Forward bottom arc (20) is shown disposed over and overlapping reverse bottom arc (14), forming bottom tensioned holder portion (26) having bottom opening (34).

FIG. 3 depicts each S-shaped plate as a hollow plate. A first hollow cavity (55a) extends through reverse top arc (18) and forward bottom arc (20). A second hollow cavity (55b) extends through forward top arc (12) and reverse bottom arc (14).

A light source (46), such as a fiber optic light kit, is depicted disposed within second hollow cavity (55b). It is contemplated that in this embodiment, reverse top arc (18), forward bottom arc (20), forward top arc (12), and reverse bottom arc (14) can be made from a transparent or translucent material, allowing light from light source (46) to pass through each arc, illuminating objects contained within top opening (30) and bottom opening (34), and illuminating the area surrounding the tension-based fastener.

While one light source (46) is depicted in second hollow cavity (55b), located centrally within the tension-based fastener, any number of light sources can be disposed at any location within first hollow cavity (55a) and second hollow cavity (55b). Other materials, such as structural fillers or foams, aesthetic fillers, such as wood or colored objects, or protective materials, such as flame retardant or corrosion-resistant fillers, can also be placed within the hollow cavities.

Figure 4:
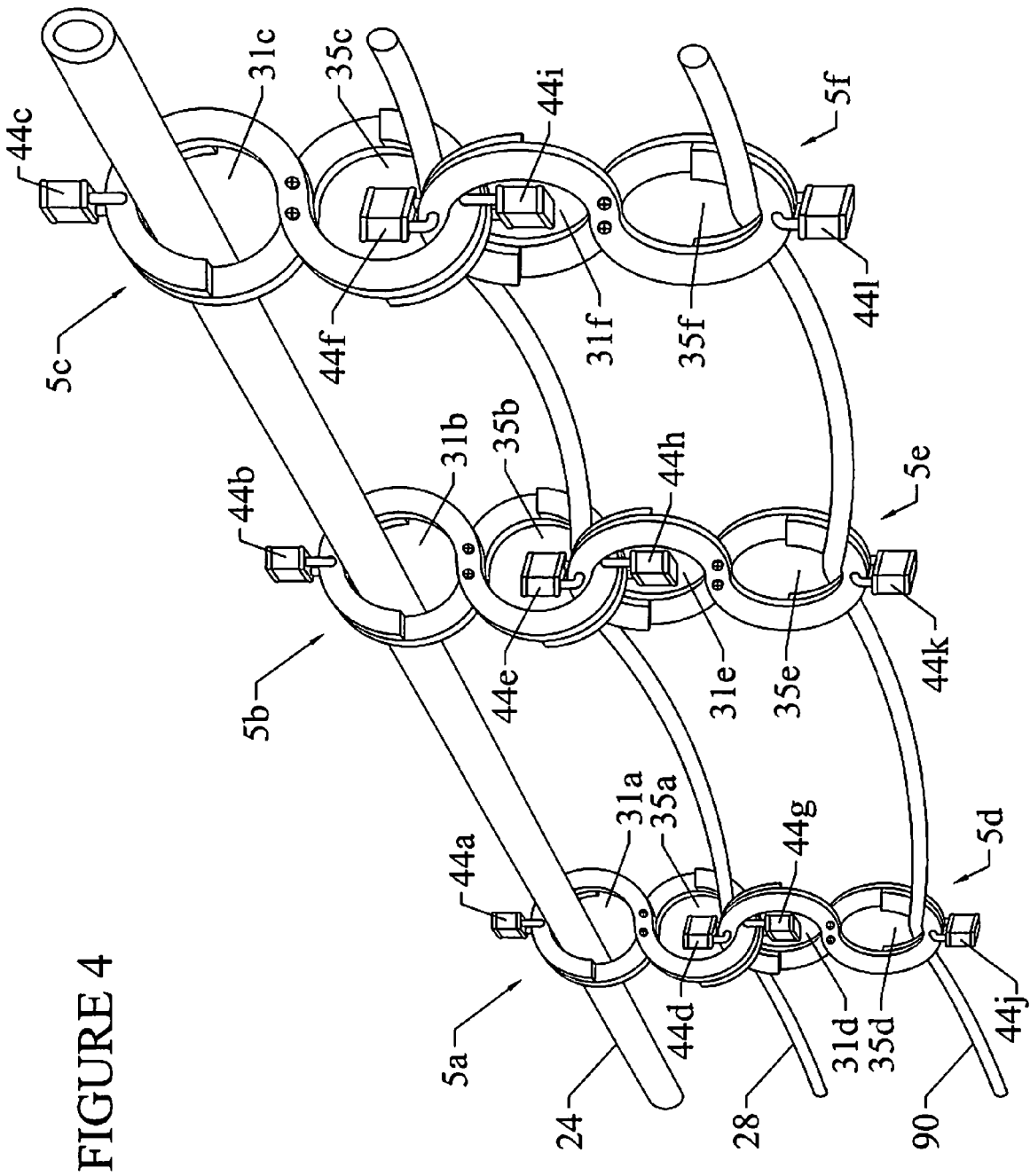
FIG. 4 depicts an embodiment of a fastening system using a plurality of tension-based fasteners.

Referring now to FIG. 4, a system using a plurality of tension-based fasteners is depicted.

A first tension-based fastener (5a), a second tension-based fastener (5b), and a third tension-based fastener (5c) are shown secured to a first object (24) and a second object (28). First tension-based fastener (5a), second tension-based fastener (5b), and third tension-based fastener (5c) are contemplated to be of similar construction to the embodied tension-based fastener depicted in FIG. 2.

First tension-based fastener (5a) has a first top opening (31a) and a first bottom opening (35a). Second tension-based fastener (5b) has a second top opening (31b) and a second bottom opening (35b). Third tension-based fastener (5c) has a third top opening (31c) and a third bottom opening (35c).

First object (24), which is depicted as a pipe, is shown passing through first top opening (31a), second top opening (31b), and third top opening (31c), such that first tension-based fastener (5a), second tension-based fastener (5b), and third tension-based fastener (5c) hang securely from first object (24) and are held aloft by first object (24).

Second object (28), which is depicted as a flexible cord, is shown passing through first bottom opening (35a), second bottom opening (35b), and third bottom opening (35c), such that second object (28) hangs securely and is held aloft by first tension-based fastener (5a), second tension-based fastener (5b), and third tension-based fastener (5c).

While first object (24) is depicted as a single pipe, and second object (28) is depicted as a single flexible cord, any number and any type of objects can extend through each tension-based fastener, as long as the total number and size of objects does not exceed the capacity of the diameter.

A first locking device (44a) secures the first top opening (31a) of first tension based fastener (5a) around first object (24). A seventh locking device (44g) secures the first bottom opening (35a) of first tension based fastener (5a) around second object (28).

A second locking device (44b) secures the second top opening (31b) of second tension based fastener (5b) around first object (24). An eighth locking device (44h) secures the second bottom opening (35b) of second tension based fastener (5b) around second object (28).

A third locking device (44c) secures the third top opening (31c) of third tension based fastener (5c) around first object (24). A ninth locking device (44i) secures the third bottom opening (35c) of third tension based fastener (5c) around second object (28).

A fourth tension based fastener (5d) having a fourth top opening (31d) and a fourth bottom opening (35d) is simultaneously secured through first bottom opening (35a) of first tension-based fastener (5a).

A fifth tension based fastener (5e) having a fifth top opening (31e) and a fifth bottom opening (35e) is simultaneously secured through second bottom opening (35b) of second tension-based fastener (5b).

A sixth tension based fastener (5f) having a sixth top opening (31f) and a sixth bottom opening (35f) is simultaneously secured through third bottom opening (35c) of third tension-based fastener (5c).

A third object (90), which is depicted as a flexible cord extends through and is secured by fourth bottom opening (35d), fifth bottom opening (35e), and sixth bottom opening (35f), such that third object (90) hangs securely and is held aloft by fourth tension-based fastener (5d), fifth tension-based fastener (5e), and sixth tension-based fastener (5f).

A fourth locking device (44d) secures the fourth top opening (31d) of fourth tension-based fastener (5d) around first tension-based fastener (5a). A tenth locking device (44j) secures the fourth bottom opening (35d) of fourth tension based fastener (5d) around third object (90).

A fifth locking device (44e) secures the fifth top opening (31e) of fifth tension-based fastener (5e) around second tension-based fastener (5b). An eleventh locking device (44k) secures the fifth bottom opening (35e) of fifth tension based fastener (5e) around third object (90).

A sixth locking device (44f) secures the sixth top opening (31f) of sixth tension-based fastener (5f) around third tension-based fastener (5c). A twelfth locking device (44l) secures the sixth bottom opening (35f) of sixth tension based fastener (5f) around third object (90).

While FIG. 4 depicts a system including two rows of tension-based fasteners vertically secured to one another for suspending a second and third object from a first object, it is contemplated that any number of tension-based fasteners can be vertically secured to simultaneously secure any number of objects, limited by the maximum weight capacity of the first horizontal row of tension-based fasteners.

Figure 5B:
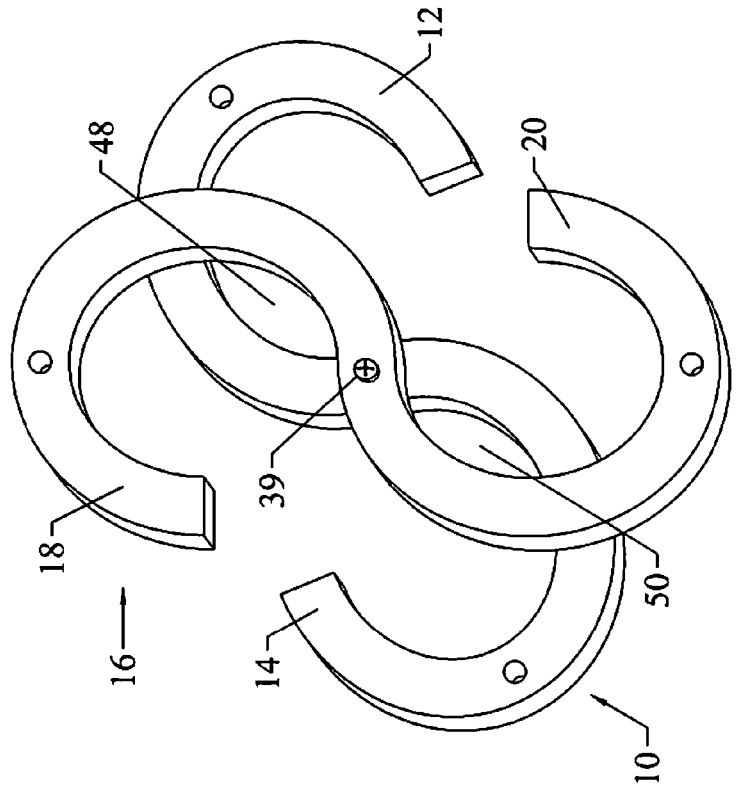
FIG. 5B depicts the figure-eight-shaped fastener of FIG. 5A in an open position.
Figure 5A:
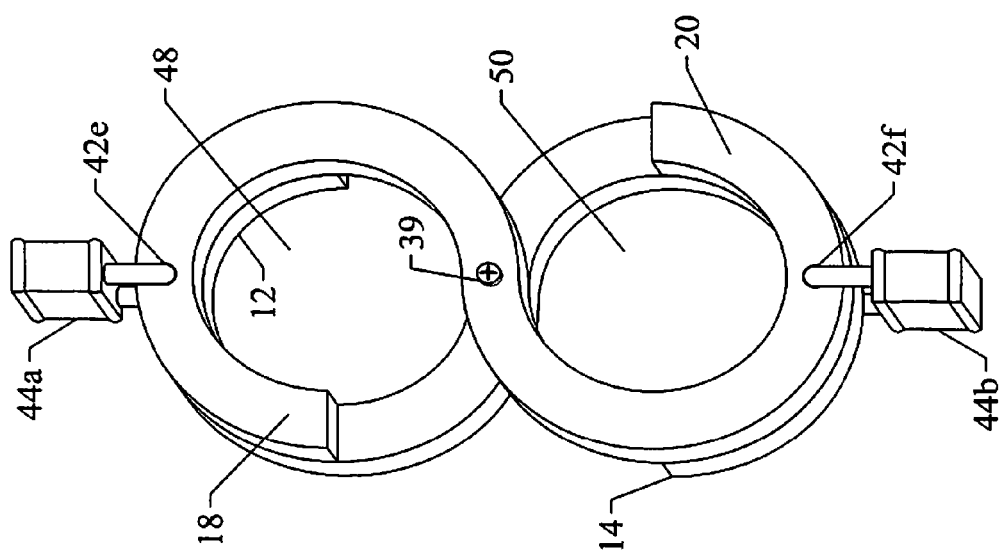
FIG. 5A depicts an embodiment of a figure-eight-shaped fastener in a closed position.

Referring now to FIG. 5A, an embodiment of a figure-eight-shaped fastener is shown.

The depicted figure-eight-shaped fastener is formed from two overlapping S-shaped, nonmetallic plates connected by a fastener (39).

Reverse top arc (18) is shown disposed over and overlapping forward top arc (12), forming an openable top holder portion (48). It is contemplated that openable top holder portion (48) can be opened to receive one or more objects by laterally moving reverse top arc (18), forward top arc (12), or combinations thereof.

Forward bottom arc (20) is shown disposed over and overlapping reverse bottom arc (14), forming an openable bottom holder portion (50). It is contemplated that openable bottom holder portion (50) can be opened to receive one or more objects by laterally moving forward bottom arc (20), reverse bottom arc (14), or combinations thereof.

A fifth perforation (42e) is disposed through reverse top arc (18) and forward top arc (12) for receiving a first locking device (44a). First locking device (44a) can be used to secure openable top holder portion (48) in a closed position to prevent the accidental release of an object secured within openable top holder portion (48).

A sixth perforation (42f) is disposed through forward bottom arc (20) and reverse bottom arc (14) for receiving a second locking device (44b). Second locking device (44b) can be used to secure openable bottom holder portion (50) in a closed position to prevent the accidental release or theft of an object secured within openable bottom holder portion (50).

FIG. 5B depicts the figure-eight-shaped holder of FIG. 5A in an open position.

A reverse S-shaped, nonmetallic plate (16) having reverse top arc (18) and forward bottom arc (20) is disposed over a forward S-shaped, nonmetallic plate (10) having forward top arc (12) and reverse bottom arc (14). Fastener (39) secures reverse S-shaped, nonmetallic plate (16) to forward S-shaped, nonmetallic plate (10). It is contemplated that fastener (39) allows each S-shaped, nonmetallic plate to rotate to open and close top openable holder portion (48) and bottom openable holder portion (50).

The positioning of reverse S-shaped, nonmetallic plate (16) in relation to forward S-shaped, nonmetallic plate (10) causes top openable holder portion (48) and bottom openable holder portion (50) to be in an open position for receiving one or more objects. Movement of reverse S-shaped, nonmetallic plate (16), forward S-shaped, nonmetallic plate (10), or combinations thereof can be used to close top openable holder portion (48) and bottom openable holder portion (50).

While these embodiments have been described with emphasis on the embodiments, it should be understood that within the scope of the appended claims, the embodiments might be practiced other than as specifically described herein.

What is claimed is:

1. A tension-based fastening system for holding an article consisting of:
    a forward-facing S-shaped plate consisting of: a forward top arc, a reverse bottom arc, and a first perforation disposed therethrough;
    a reverse-facing S-shaped plate consisting of: a reverse top arc, a forward bottom arc, and a second perforation disposed therethrough, wherein each top arc and each bottom arc has a contact surface;
    wherein the reverse-facing S-shaped plate is disposed over the forward-facing S-shaped plate,
    a fastener simultaneously disposed through the first perforation and the second perforation connecting the reverse-facing S-shaped plate to the forward-facing S-shaped plate, forming a top tensioned holder portion for removably holding a first object and a bottom tensioned holder portion for removably holding a second object;
    a third perforation disposed through the forward top arc proximate a top of the forward-facing S-shaped plate;
    a fourth perforation disposed through the reverse bottom arc proximate a bottom of the forward-facing S-shaped plate;
    a fifth perforation disposed through the reverse top arc proximate a top of the reverse-facing S-shaped plate;
    a sixth perforation disposed through the forward bottom arc proximate a bottom of the a reverse-facing S-shaped plate;
    a first locking device simultaneously engaged through the third perforation and the fifth perforation;
    a second locking device simultaneously engaged through the fourth perforation and the sixth perforation;
    wherein the reverse top arc contact surface is disposed over and contacts the forward top arc contact surface, forming a top opening for securing around the first object, wherein the contact between the reverse top arc contact surface and the forward top arc contact surface provides a tension between each top arc wherein the tension maintains the top tensioned holder portion in a closed position around the first object; and
    wherein the reverse bottom arc contact surface is disposed over and contacts the forward bottom arc contact surface, forming a bottom opening for securing around the second object, wherein the contact between the reverse bottom arc contact surface and the forward bottom arc contact surface provides a tension between each bottom arc, wherein the tension maintains the bottom tensioned holder portion in a closed position around the second object.

2. The tension-based fastening system of claim 1, wherein each S-shaped plate is generally flat.

3. The tension-based fastening system of claim 1, wherein the forward-facing S-shaped plate and the reverse-facing S-shaped plate are an extruded S-shape with at least one arc of 270 degrees.

4. The tension-based fastening system of claim 1, wherein the top opening has a first diameter and the bottom opening has a second diameter, and wherein the first and second diameters are different diameters.

5. The tension-based fastening system of claim 1, wherein each S-shaped plate comprises a metallic S-shaped plate.

6. The tension-based fastening system of claim 1, wherein each S-shaped plate comprises a nonmetallic material selected from the group consisting of: plastic, metal encapsulated by a nonmetallic substance, fiberglass-reinforced plastic, a urethane-coated material, a polyamide, a fiberglass composite, an epoxy-based resin, and combinations thereof.

7. A figure-eight-shaped holding system for holding objects consisting of:
    a forward-facing S-shaped plate consisting of: a forward top arc, a first perforation disposed through the forward top arc, a reverse bottom arc, and a second perforation disposed through the reverse bottom arc;
    a reverse-facing S-shaped plate consisting of: a reverse top arc, a third perforation disposed through the reverse top arc, a forward bottom arc, and a fourth perforation disposed through the forward bottom arc, wherein each top arch and each bottom arc comprises a contact surface;
    a first locking device simultaneously engaged through the first perforation and the third perforation;
    a second locking device simultaneously engaged through the second perforation and the fourth perforation;
    wherein the reverse-facing S-shaped plate is disposed over and pivotably connected to the forward-facing S-shaped plate with a fastener, forming a top openable holder portion for securely and removably holding a first object and a bottom openable holder portion for securely and removably holding a second object;
    wherein the reverse top arc contact surface is disposed over and contacts the forward top arc contact surface, forming a top opening wherein the contact between the reverse top arc contact surface and the forward top arc contact surface provides a tension between each top arc, wherein the tension maintains the top openable holder portion in a closed position; and
    wherein the reverse bottom arc contact surface is disposed over and contacts the forward bottom arc contact surface, forming a bottom opening wherein the contact between the reverse bottom arc contact surface and the forward bottom arc contact surface provides a tension between each bottom arc, wherein the tension maintains the bottom openable holder portion in a closed position.

8. The figure-eight-shaped holding system of claim 7, wherein each S-shaped plate is generally flat.

9. The figure-eight-shaped holding system of claim 7, wherein the forward-facing S-shaped plate and the reverse-facing S-shaped plate are an extruded S-shape with an arc of 270 degrees.

10. The figure-eight-shaped holding system of claim 7, wherein the top opening has a first diameter and the bottom opening has a second diameter, and wherein the first and second diameters are different diameters.

11. The figure-eight-shaped holding system of claim 7, wherein the first perforation is disposed through the forward top arc proximate a top of the forward-facing S-shaped plate, wherein the second perforation is disposed through the reverse bottom arc proximate a bottom of the forward-facing S-shaped plate, wherein the third perforation is disposed through the reverse top arc proximate a top of the reverse-facing S-shaped plate, and wherein the fourth perforation is disposed through the forward bottom arc proximate a bottom of the reverse-facing S-shaped plate.

12. A tension-based fastening system for holding an article consisting of:
 a. a forward-facing S-shaped plate consisting of:
  i. a forward top arc having a contact surface;
  ii. a reverse bottom arc having a contact surface; and
  iii. a first perforation disposed through the forward-facing S-shaped plate;
 b. a reverse-facing S-shaped plate disposed over the forward-facing S-shaped plate forming a top holder portion and a bottom holder portion, wherein the reverse-facing S-shaped plate consists of:
  i. a reverse top arc having a contact surface;
  ii. a forward bottom arc having a contact surface; and
  iii. a second perforation disposed through the reverse-facing S-shaped plate;
 c. a first fastener simultaneously disposed through the first perforation and the second perforation connecting the reverse-facing S-shaped plate to the forward-facing S-shaped plate;
 d. a third perforation disposed through the forward top arc proximate a top of the forward-facing S-shaped plate;
 e. a fourth perforation disposed through the reverse bottom arc proximate a bottom of the forward-facing S-shaped plate;
 f. a fifth perforation disposed through the reverse top arc proximate a top of the reverse-facing S-shaped plate;
 g. a sixth perforation disposed through the forward bottom arc proximate a bottom of the a reverse-facing S-shaped plate;
 h. a first locking device simultaneously engaged through the third perforation and the fifth perforation; and
 i. a second locking device simultaneously engaged through the fourth perforation and the sixth perforation;
 wherein the top holder portion comprises a top opening formed by disposing the reverse top arc contact surface over the forward top arc contact surface providing a tension between each top arc, wherein the tension maintains the top holder portion in a closed position for securing the top opening around a first object; and
 wherein the bottom holder portion comprises a bottom opening formed by disposing the reverse bottom arc contact surface over the forward bottom arc contact surface providing a tension between each bottom arc, wherein the tension maintains the bottom holder portion in a closed position for securing the bottom opening around a second object.

13. The tension-based fastening system of claim 1, wherein the first perforation is disposed through the forward-facing S-shaped plate proximate a center of the forward-facing S-shaped plate, and wherein the second perforation is disposed through the reverse-facing S-shaped plate proximate a center of a reverse-facing S-shaped plate.

14. The tension-based fastening system of claim 12, wherein the first perforation is disposed through the forward-facing S-shaped plate proximate a center of the a forward-facing S-shaped plate, and wherein the second perforation is disposed through the reverse-facing S-shaped plate proximate a center of the reverse-facing S-shaped plate.

* * * * *